(12) United States Patent
Thode et al.

(10) Patent No.: US 10,837,573 B2
(45) Date of Patent: Nov. 17, 2020

(54) ELECTROMAGNETICALLY OPERABLE VALVE DEVICE

(71) Applicant: ETO MAGNETIC GMBH, Stockach (DE)

(72) Inventors: Oliver Thode, Stockach (DE); Viktor Raff, Constance (DE)

(73) Assignee: ETO MAGNETIC GMBH, Stockach (DE)

( * ) Notice: Subject to any disclaimer, the term of this patent is extended or adjusted under 35 U.S.C. 154(b) by 128 days.

(21) Appl. No.: 16/095,551

(22) PCT Filed: Mar. 30, 2017

(86) PCT No.: PCT/EP2017/057621
§ 371 (c)(1),
(2) Date: Oct. 22, 2018

(87) PCT Pub. No.: WO2017/182251
PCT Pub. Date: Oct. 26, 2017

(65) Prior Publication Data
US 2020/0240541 A1 Jul. 30, 2020

(30) Foreign Application Priority Data

Apr. 21, 2016 (DE) .................. 10 2016 107 446
Aug. 3, 2016 (DE) .................. 10 2016 114 347

(51) Int. Cl.
*F16K 31/06* (2006.01)

(52) U.S. Cl.
CPC ...... *F16K 31/0627* (2013.01); *F16K 31/0606* (2013.01); *F16K 31/0675* (2013.01)

(58) Field of Classification Search
CPC ............. F16K 31/0606; F16K 31/0627; F16K 31/0675
See application file for complete search history.

(56) References Cited

U.S. PATENT DOCUMENTS 2,853,659 A     9/1958  Herion
3,185,177 A *   5/1965  Bradenberg ........ F16K 31/0627
                                              251/129.21
(Continued)

FOREIGN PATENT DOCUMENTS

DE         29825210 U1    4/2006
DE      102011052526 A1   2/2013
(Continued)

OTHER PUBLICATIONS

International Search Report for PCT/2017/057621 dated Jul. 18, 2017.

*Primary Examiner* — Eric Keasel
(74) *Attorney, Agent, or Firm* — Bachman and Lapointe PC; George Coury

(57) ABSTRACT

The invention relates to an electromagnetically operable valve device, comprising a valve housing (10) which has a first fluid connection (P) and a second fluid connection (E), each designed for controlled opening and closing by moving a closure unit (30), and at least one further fluid connection (A) provided on the valve housing, which forms a fluid channel (46) to the first or second fluid connection that can be intermittently interrupted by the closure unit. The closure unit is provided on or in an armature unit (28), which is movably guided in the valve housing along a longitudinal axis of movement (12), and which can be driven in response to the energization of a coil unit (14, 16) provided in a stationary manner in the valve housing, and which is movable between mutually opposite first and second closure positions, is designed for magnetically interacting with a stationary core unit (18) that is at least partially surrounded by the coil unit, and is biased into one of the closure positions by means of force storage means, in particular a spring (48), which acts on the armature unit, wherein the first of the closure positions is realized by a valve seat (44)

(Continued)

connected to the first fluid connection. The invention is characterized in that the core unit is provided with an elongated tube and/or sleeve section (22) which axially and preferably integrally extends a core body (20) and is, with respect thereto, reduced in diameter, forming on the end face the second fluid position assigned to the second fluid connection. Said tube and/or sleeve section is axially overlapped by a section of the armature unit and/or engages in a recess formed in the armature unit, and in one section is provided with a groove, material recess, material puncture (60, 29), material abrasion, and/or a local change in material or substances in such a way that in this section, an increase in magnetic resistance for a magnetic flux to the armature unit generated by the energized coil unit is produced. The force storage means, in particular surrounding the tube or sleeve section on the jacket side, are connected at one end to the armature unit, and at the other end to the core unit, or interact in such a way that the force storage means are located outside the fluid channel from the second fluid connection to the further fluid connection.

17 Claims, 2 Drawing Sheets

(56) References Cited

U.S. PATENT DOCUMENTS

| | | | | |
|---|---|---|---|---|
| 4,326,696 | A | * | 4/1982 | Ishikawa ............. F16K 31/0606 137/625.65 |
| 5,503,185 | A | * | 4/1996 | Krause ................ F16K 31/0606 137/625.65 |
| 6,425,409 | B1 | * | 7/2002 | Cross .................. F16K 31/0606 137/627.5 |

FOREIGN PATENT DOCUMENTS

| | | |
|---|---|---|
| EP | 2557343 A2 | 2/2013 |
| EP | 2713085 A2 | 4/2014 |

* cited by examiner

ELECTROMAGNETICALLY OPERABLE VALVE DEVICE

BACKGROUND OF THE INVENTION

The present invention relates to an electromagnetically operable valve device. Furthermore, the present invention relates to a use of such a valve device.

Electromagnetically operable valve devices are known from applicant's DE 298 25 210 U1. An armature unit that can be moved in response to a coil unit is guided in a valve housing relative to the stationary coil unit and to a stationary core unit interacting therewith, said armature unit carrying a closing unit. By movement of the armature unit, the armature unit alternately closes first and second fluid ports (typically provided axially opposite) in the housing, wherein, in the case of a typical configuration as a 3/2 valve device (i.e. with three fluid ports and two switching positions), the armature movement causing the alternate closing opens a fluid channel of the first or of the second fluid port toward another fluid port (typically also referred to as the working channel).

In a device of this kind, an NC operational state (normally closed=closed when the coil unit is not energized) or an NO operational state (normally open=open when not energized) of the valve device is established by force storage means in the form of a spring which, typically bearing against a housing portion with one end, pre-loads the armature unit into the desired normally closed position, for which purpose it bears against an outer edge or annular portion of the armature unit.

In order to ensure a fluid flow toward the second fluid port along the armature unit, which is typically displaceable coaxially to a centric bore in the core unit, channels that run axially parallel and along which the fluid can flow along the outer wall of the armature unit (and in a manner limited by a surrounding inner guide of the housing) are formed in the wall of the (typically cylindrical) armature body.

A magnetic valve device of this kind is commonly known from the state of the art and has proven useful for various fields of application, in particular since said device combines operational reliability and easy assembly owing to its constructive simplicity.

However, a device of this kind as known from DE 298 25 210 U1, which serves as generic background, still shows room for improvement in some places, in particular given that, with a view to industrial mass production and optimized operating characteristics, especially the known force storage means in the form of the compression spring acting from the outside are not ideal: on the one hand, the force storage unit, which is typically realized as a conically tapering compression spring, necessitates manual fitting during the production process because springs of this kind do not allow automated assembly in common production installations. At the same time, given the armature unit equipped with a continuous polymeric closing unit (alternatively a closing unit vulcanized on both sides) for alternately closing the first and second fluid ports, a spring of this kind has to be configured for a relatively high spring force because the armature body carrying the closing unit is solid and thus relatively heavy owing to the geometrical constraints of the known technology.

This characteristic, in turn, is connected to the described necessity of providing the armature unit with grooves in the wall or with comparable grooves for conducting fluid that run longitudinally, i.e. parallel to the axial direction. A grooving or profiling of this kind, however, leads to disadvantageous notches or undesired material erosion on a guide (e.g. armature guiding tube) surrounding the armature unit in particular during continual use, which means that there is need for improvement in this area as well. Moreover, a fluid flow caused in the grooves is not ideal with regard to fluid flow resistance, such as air, there being disadvantages in this regard as well. Finally, additional flow losses are caused by the fact that, owing to geometrical conditions, a fluid flow from and to the other fluid port (working port) flows through a portion of the compression spring, which means that an effective nominal width or flow width of the port is reduced by the spring means.

An additional disadvantage of the known groove solution for conducting fluids along the armature unit is that grooves or similar profile features conducting fluids in the wall of the armature reduce and limit a magnetically effective armature width, which means there is a negative interdependency with the conducting of fluids: the larger the armature-side grooves for the purpose of improving fluid flow, the greater the magnetic disadvantage.

SUMMARY OF THE INVENTION

Therefore, the object of the present invention is to improve an electromagnetically operable valve device according to the preamble of the main claim in terms of its actuating, operating and efficiency characteristics with a view to optimized magnetic and fluid-conducting conditions, to provide, in particular, an electromagnetically operable valve device that can be employed as a 3/2 or 2/2 valve, can be produced in a simple and automated manner, is optimized in terms of a required magnetic force (and spring force), further places low requirements on a (typically polymeric) sealing material for the closing unit, and minimizes flow losses and flow resistances with regard to a (typically pneumatic) fluid flow in the fluid channels connected according to the invention.

Said object is attained by the electromagnetically operable valve device having the features disclosed herein; advantageous embodiments of the invention are also described herein. Additional protection within the scope of the invention is sought for a use of such an electromagnetically operable valve device according to the invention for a pneumatic fluid, a use for and in an automotive pneumatic system having proven as a particularly preferred and favorable use. Furthermore, according to the invention, a use of such a device for realizing a 2/2-way valve by only partial connection of the fluid ports according to the invention is claimed, and protection is sought for a preferred use of the valve device according to the invention as a normally closed (NC) device and also as a normally open (NO) valve device by correspondingly switched connection of the first and second fluid ports according to the invention at the hand of a user.

In an advantageous manner according to the invention, first, the core unit is realized according to the invention in the form of two (preferably integrally adjacent) sections, namely the core body on the one hand and the oblong tube and/or sleeve portion according to the invention which axially continues the core body on the other hand, the tube and/or sleeve portion being centrally drilled through, more preferably in the manner of a nozzle, in order to conduct fluids and offering the second closed position at the end for being picked up in a closing manner by the closing unit of the armature unit so as to become connected to the second fluid port.

According to the invention, the oblong tube and/or sleeve portion of the core unit now advantageously allows the armature unit (which, in turn, is itself advantageously designed cup-shaped or pot-shaped in an embodiment according to the invention) to engage over it, the tube and/or sleeve portion thus being inserted into a depressed or hollow open portion of the armature unit, and the closing unit (which itself is in turn preferably formed at the bottom of the armature unit) being able to seal the free end (nozzle portion) of the tube and/or sleeve portion in order to close the second fluid port only after the inserted state has been achieved.

Such a geometry according to the invention thus allows a cylindrical spring, more preferably a compression spring, to be provided as a force storage, which can then bear against the core body (having a widened diameter) at one end and against the bottom of the armature unit at the other end and thus realizes a normally closed (NC) configuration with regard to the first fluid port, for example; according to the invention, the latter is open toward the first fluid port, which is advantageously made possible by a valve seat located axially opposite the core unit and correspondingly interacting with an opposite sealing surface of the closing unit. Advantageously, according to the invention, such a device thus allows fully automatic installation of the cylindrical spring and thus a further increase in efficiency of assembly.

Additionally, this geometry also realizes other advantages, such as owing to the fact that not only does the advantageous cup or pot shape (which allows the armature unit to axially engage over the tube and/or sleeve portion) significantly reduce the weight of the armature unit, which, in turn, reduces the spring forces required of the force storage means, but such a cup or pot shape of the armature unit according to the invention having a bottom-side closing unit (integrated in the armature unit) requires significantly simpler sealing technology for said closing unit (namely an axially shorter polymeric portion with thus reduced expansion and temperature effects). Also, the lighter armature (drilled hollow according to an embodiment of the invention) significantly reduces potentially harmful vibrations and, owing to its lower weight, lowers the requirements placed on a needed magnetic force for driving the armature unit, which, in turn, is accompanied by advantages for the magnetic configuration of the other participating components, such as the flux-conducting geometry for the electromagnetic flux or the design of the coil means.

For the purpose of magnetic optimization, it is provided according to the invention for the tube and/or sleeve portion of the core unit, typically at a wall section axially spaced apart from the core body, to be provided with a groove, a material depression, a material puncture, a local material modification and/or an inner or outer material erosion in such a manner that an increase in magnetic resistance to a magnetic flux flowing through the tube and/or sleeve portion occurs at said material-reduced or material-modified wall section.

This can be achieved by material removal, e.g. by machining, in the magnetically conductive section, wherein said material removal can take place both in the outer wall, i.e. radially outside at the tube and/or sleeve portion, and at an inner wall section in the tube and/or sleeve portion, where it will typically be realized by a (potentially stepped, sectionwise widened) centric bore and alternatively also by internal widening using a suitable milling or turning tool.

On the other hand, as an addition or alternative, the modification or influencing of material according to the invention can take place, for example, by local thermal treatment (e.g. annealing in the wall section) with the aim of reducing the magnetic conductibility of the magnetically conductive material in that spot. As another alternative, a (e.g. welded) axial sequence of metal materials having good magnetic conductibility and no or low magnetic conductibility is contemplated for realizing the tube/sleeve portion. Within the context of the invention, this is advantageous and increases the efficiency insofar as it allows preventing a significant magnetic flux portion from flowing along the tube and/or sleeve portion and then perpendicular to the armature unit, thus avoiding an undesired magnetic shunt.

In a preferred embodiment, the closing unit according to the invention is not realized exclusively from a (e.g. polymeric) sealing material, but instead, and more preferably, in a cross-sectional double T-shape, for example, in a surrounding hard body which itself is then integrated in the armature unit or forms the bottom thereof, properly sealing surfaces or contact surfaces thus being produced as closing surfaces on both ends, said closing surfaces receiving a best possible closing or contact pressure with regard to their respective seat through the armature.

It is advantageously envisaged that openings or similar passages are provided in the support section (made of the inelastic, nevertheless polymeric material itself, such as for reasons of automatic producibility by plastic injection molding), which support the actual polymeric sealing material, said openings or passages channeling the fluid flow, in particular from the other fluid port to the second fluid port; a configuration of this kind then realizes the flow and efficiency advantage that the force storage means according to the invention (preferably realized as a cylindrical compression spring) remain unaffected by said fluid flow because they are located outside of the fluid flow, flow losses thus being avoided.

In the manner described as per the invention, an electromagnetically operable valve device is thus realized which exhibits actuating and operating advantages that are evolved compared to the existing generic technology in several, albeit synergistically interactive technical aspects, combining advantages in production with efficiency advantages with regard to the magnetic and flow characteristics and, as a result, realizing a valve device as a 3/2 structure which is favorably suitable for pneumatic fluid routing in an automotive context while neither being limited to said use nor the possible 3/2 topology necessarily having to be connected in that manner. Instead, suitable connecting of the fluid ports and suitable switching of the first and second fluid ports, in particular, easily allows using the device as a 2/2 valve. In the context of use, both an NO and an NC function can be realized.

BRIEF DESCRIPTION OF THE DRAWINGS

Other advantages, features and details of the invention are apparent from the following description of preferred embodiment examples and from the figures.

DETAILED DESCRIPTION

Figure 1:
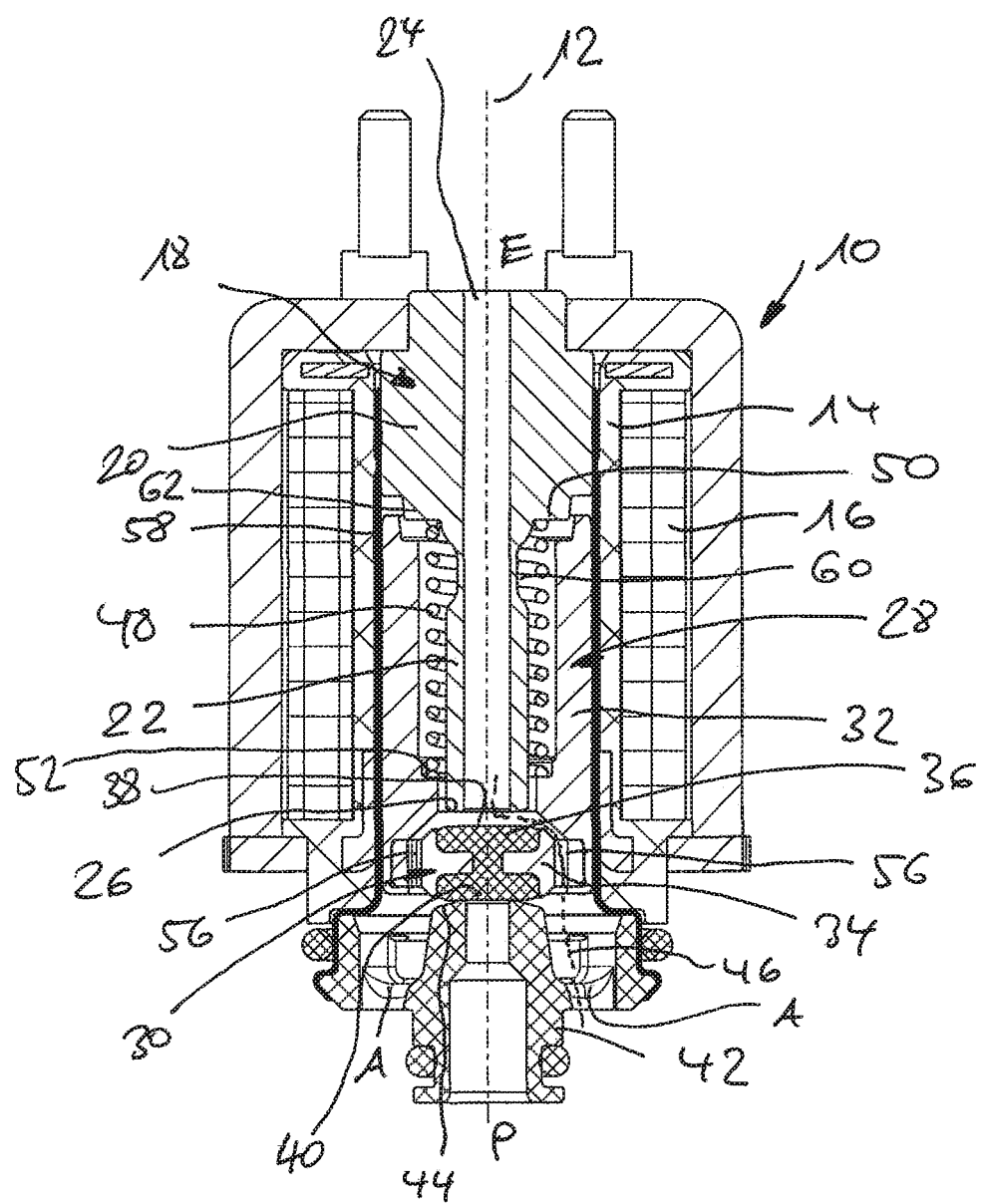
FIG. 1 is a longitudinal-section view of the electromagnetically operable valve device according to a first preferred embodiment as a 3/2 valve in the NC configuration with a pressure port provided at the bottom and configured as a first fluid port and with an opposite ventilation port associated with the core unit.

In the longitudinal-section view of the first embodiment example, FIG. 1 shows a surrounding valve housing 10 which accommodates a valve technology formed substantially radially symmetrical (alternatively in the shape of a C-bracket) around a longitudinal axis 12. A winding 16 (coil unit) supported on a coil support 14 surrounds an equally stationary core unit 18, which is formed by a core body 20, which is located at the top in FIG. 1, and by a tube and/or sleeve portion 22, which is integrally adjacent thereto and which has a smaller diameter than the body 20. An axial bore 24 extends through the core unit, forms the ventilation port E (as the second fluid port according to the invention) in the direction toward the outside of the housing and ends in a nozzle-like outlet 26 in the manner of a nozzle at the opposite end, said outlet 26 being formed by crimping and serving as a valve seat for a closing unit 30, which is situated on an armature unit 28, is moved by said armature unit 28, and will be described later.

Specifically, the armature unit 28 is realized by a pot- or cup-shaped armature body 32 which, open toward the top by a hollow bore in FIG. 1, is designed to receive or laterally engage over a substantial part of the tube and/or sleeve portion 22.

In the lower end region, and thus for forming an armature bottom, the body 32 is closed by the closing body 34, which is formed from a hard polymeric material and in which polymeric, soft, and sealing material 36 is introduced in the manner of an integral cross-sectional double-T shape by injection in such a manner that sealing surfaces 38, 40 located opposite each other along the axial direction (i.e. along axis 12) are produced, of which one sealing surface 38 (the top one in FIG. 1) is dimensioned and designed to engage onto the outlet end 26 of the piston portion 22 in a sealing manner.

At the axially opposite end, the sealing surface 40 is designed to interact in a sealing manner with an equally nozzle-like valve seat 44 formed on a valve seat module 42 and communicating with a pressure port P (as the first fluid port within the meaning of the invention).

Within the module 42, next to the bore associated with the fluid inlet T, a radially circular working port A is formed which, in accordance with an actuated and closed position of the closing unit 30 at the armature 28, is open toward the ventilation port E (which state corresponds to the normal actuated or closed state of FIG. 1 and is indicated by dashed line 46) on the one side, the lower sealing surface 40 of the closing unit 30 engaging onto the valve seat 44 and closing the fluid port P. On the other side, when the coil 32 is energized, the armature unit's sealing surface 38 will close the outlet of the tube and/or sleeve portion 22, said outlet acting as the core-side valve seat 26, as opposed to the position of FIG. 1 and against a restoring action of a cylindrical compression spring 48 (one end of which bears against an annular shoulder 50 at the core body 20 and the other end of which bears against an interior annular shoulder 52), thus allowing fluid communication from the pressure port P to the working port A.

As becomes clear, not only does the design and mounting of the compressing spring 48 allow a cylindrical and thus automatically mountable shape, said compression spring is also located outside of the fluid path (fluid channel) both in the case of a fluid communication E-A (according to dashed line 46 in FIG. 1) and outside of a fluid communication P-A made possible in the alternative state of connection. Accordingly, the spring does not adversely effect the flow in any way and, additionally, the shown spring shape in connection with the armature design reduced in weight (as achieved by the cup shape) leads to a lower spring force, whereby, in turn, less magnetic force is required for moving the armature, which means that this behavior, too, is optimized compared to the generic state of the art.

Aside from the closing unit 30 geometry, which is realized from multiple materials, the closing unit 30 itself thus being of a modular design, producible in an automated manner and attachable to the armature body 32, the longitudinal-section view of FIG. 1 additionally clarifies how openings in the form of bores 56 which are distributed radially around the circumference of the module 30 are part of the fluid channel toward the ventilation port E; in other words, both a fluid communication P-A and a fluid communication A-E each run through said openings in the hard plastic material of the support 34 of the module 30 before the fluid then enters the centric channel in the core 18, said channel formed by bore 24, and reaches the outlet E. This makes clear that the armature body 32, which is guided in an armature guiding tube 58 made of a non-magnetic material in an otherwise known manner, does not have any wall-side slots, profiles or other fluid-conducting sections of that kind, which means that neither is the armature guiding tube 58 notched or otherwise mechanically stressed during continuous operation, nor is an effective magnetic cross-section disadvantageously reduced by such wall-side grooves, which are unnecessary unlike in the state of the art.

A wall-side puncture 60 formed in the tube and/or sleeve portion 22 is additionally relevant for the magnetic movement and efficiency behavior of the device, said puncture 60, which radially erodes a wall of the section 20, offering significant resistance to the magnetic flux in the associated area of the tube and/or sleeve portion 22 adjacent to the body 20. Enough material is removed for magnetic saturation to occur in the area 60 when a magnetic flux is applied. This measure has the advantageous effect that a substantial magnetic flux flows efficiently in terms of force and movement across a cone portion 62 toward the armature and does not close a magnetically inefficient shunt circuit at the end side or in the area of the outlet 26, for example.

Figure 2:
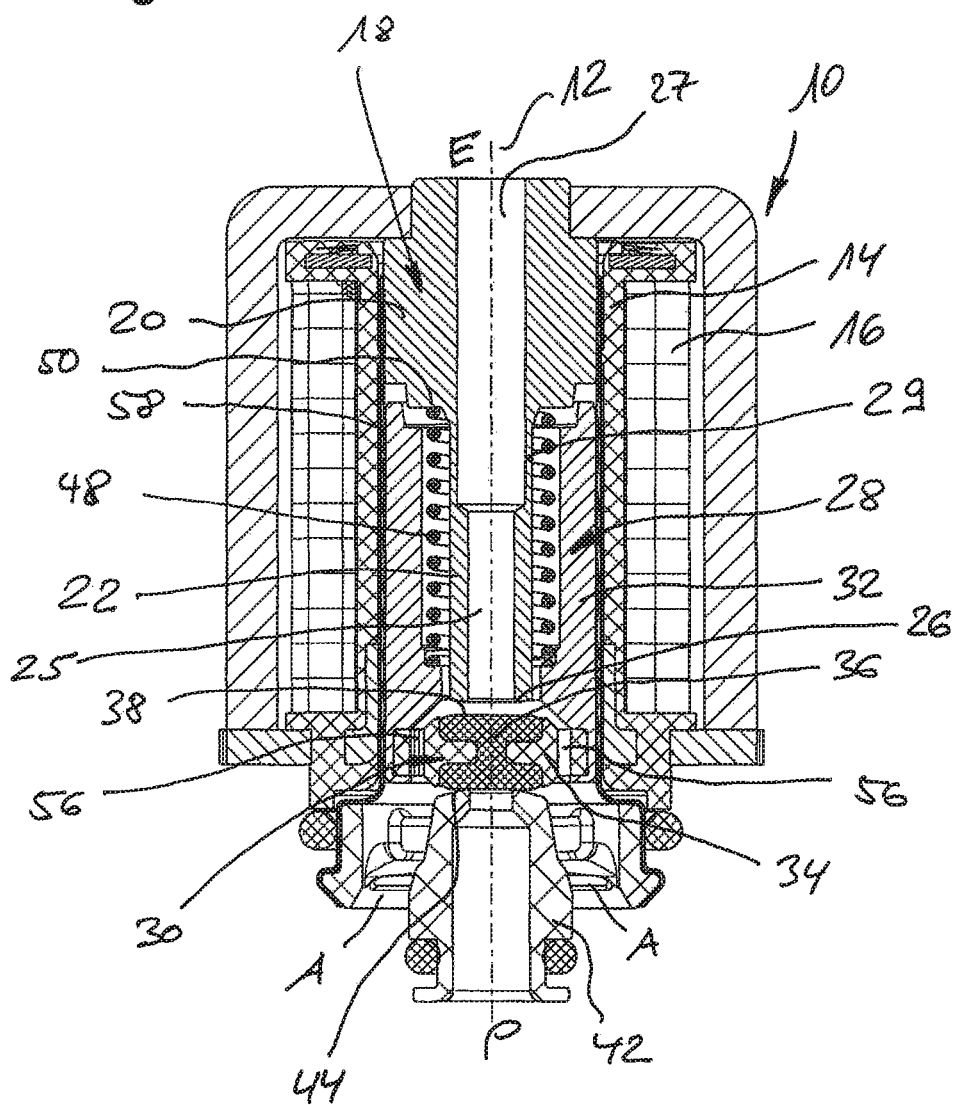
FIG. 2 is a longitudinal-section view analogous to the illustration of FIG. 2 and showing a second embodiment of the electromagnetically operable valve device which, in contrast to the first embodiment example of FIG. 1, has an area having material removed and located on the inside of the wall for establishing a local increase in magnetic resistance.

Structurally, the second embodiment example of FIG. 2 largely corresponds to the first embodiment example of FIG. 1; for instance, both the housing with the inner electromagnet components and the armature structure and the movement and switching functions are identical to the first embodiment example of FIG. 1. Reference signs identical to those of FIG. 1 signify identical or functionally immediately equivalent modules and components, which is why a repeated description of these (identical) components is omitted with regard to FIG. 2 and reference is made to the above description relating to FIG. 1.

The second embodiment example of FIG. 2 differs from the first embodiment example of FIG. 1 substantially in an alternative design of the area 29 of increased magnetic resistance or resistance to magnetic-flux in the area of transition between the tube and/or sleeve portion 22 and the core body 20. Here, too, both modules are integrally connected to each other, the area 29 of transition having a reduced effective material thickness causing an early magnetic saturation to occur analogously to the manner described above in relation to FIG. 1 and, correspondingly, the desired magnetic decoupling of the magnetic flux toward the (axially) forward tube and/or sleeve portion 22 to occur.

In contrast to the first embodiment example, the material reduction in area 29 is realized by another bore 27, which is introduced into the core body 20 from the direction of the ventilation port E and which widens a continuous bore 25 (to this extent corresponding to the bore 24 in FIG. 1), said other bore 27, since it widens bore 25 from the inside, determining the axial extension of the resistance-increasing area 29 between the end of the core body 20 and a depth of penetration of the bore 27 into the tube and/or sleeve portion 22. As becomes clear, in addition to this radially inward shift of the material removal according to the invention, an alternative, simple and elegant in terms of production, to a turning or milling process by means of which the groove 60 was produced in the first embodiment example of FIG. 1 is provided. Hence, the additional widening bore 27 in FIG. 2 is to be interpreted merely as an exemplary option of realizing a material removal from the inside; an area of increased magnetic resistance in the core material which has the desired axial extension could also be produced using alternative machining tools, such as angular or depressed-center milling tools.

While the embodiment examples shown in FIG. 1 and FIG. 2 are a pneumatic 3/2-way valve which realizes an NC configuration in a manner particularly suitable for application in pneumatic systems in automobiles, it is possible to use these devices as NO (i.e. open in the non-energized state of the coil 16) by simply switching the ports at P and E. Also, the shown devices can be used as a 2/2-way valve by only partially connecting the three fluid ports P, E, A.

The invention claimed is:

1. An electromagnetically operable valve device, comprising
   a valve housing (10) which has first (P) and second (E) fluid ports each configured to be opened and closed in a controlled manner by movement of a closing unit (30) and at least one other fluid port (A) which is provided on the valve housing and which forms a fluid channel (46) toward the first and second fluid ports which can be alternately interrupted by the closing unit,
   the closing unit being provided on an armature unit (28), which is guided within the valve housing in a manner displaceable along a longitudinal axis of movement (12) and can be driven in response to energization of a coil unit (14, 16) provided stationary in the valve housing, the armature unit being displaceable between opposite first and second closed positions,
   being configured for magnetic interaction with a stationary core unit (18) which is at least partially surrounded by the coil unit
   and being pre-loaded into one of the closed positions by force storage means, acting on the armature unit,
   the first closed position being realized by a valve seat (44) connected to the first fluid port,
   wherein
   the core unit has an oblong sleeve portion (22) continuing a core body (20) in an axial manner, having a smaller diameter than the core body, and forming, at its end, a valve seat for the second closed position associated with the second fluid port,
   a portion of the armature unit axially extending over the sleeve portion (22),
   and the sleeve portion having a reduced wall thickness in one area in such a manner that an increase in magnetic resistance to a magnetic flux generated by the energized coil unit and flowing toward the armature unit occurs in said area,
   the force storage means, which surround the wall of the sleeve portion, being connected or interacting with the armature unit at one end and with the core unit at the other end in such a manner that the force storage means are located outside of the fluid channel from the second fluid port to the other fluid port, wherein an axially extending centric bore (24; 25, 27) for conducting fluid is formed in the sleeve portion, and wherein a wall thickness in the area is depressed by at least 60% with respect to an adjacent undepressed wall thickness of the sleeve portion.

2. The device according to claim 1, wherein the force storage means are configured as a cylindrical compression spring (42) and are configured to facilitate automated assembly.

3. The device according to claim 1, wherein the force storage means are configured as a cylindrical compression spring (42) bearing on the core body of the core unit at one end, the core body having a greater diameter than the sleeve portion, and on an inner abutment, comprising an annular shoulder (52), of the armature unit at the other end.

4. The device according to claim 1, wherein the closing unit, which forms closing surfaces (38, 40) on both axial sides, is provided at the end of the armature unit.

5. The device according to claim 4, wherein the closing unit has an axial extension that is less than 30% of a maximum axial extension of the armature unit.

6. The device according to claim 5, wherein the axial extension is less than 20% of the maximum axial extension of the armature unit.

7. The device according to claim 1, wherein the closing unit (30), which has a sealing body (36) made of an elastic material, is configured in such a manner that the fluid channel from the second fluid port to the other fluid port runs adjacent to the sealing body through an end-side passage (56) of the armature unit.

8. The device according to claim 7, wherein the end-side passage is formed in a support section (34) which supports the sealing body and which is made of an inelastic material and which, together with the sealing body, forms a sealing module as a closing unit for being fixed in place on a metallic material of the armature unit.

9. The device according to claim 8, wherein the support section is made of a polymeric material.

10. The device according to claim 8, wherein the closing unit is fixed in place at the end of the armature unit.

11. The device according to claim 1, wherein the sleeve portion (22) continues the core body (20) in an integral manner.

12. The device according to claim 1, wherein the armature unit has a cylindrical outer wall without a wall-side fluid-conducting channel.

13. The device according to claim 12, wherein the armature unit is cup-shaped and wherein the cylindrical outer wall is without a wall-side fluid-conducting groove.

14. An electromagnetically operable valve device, comprising a valve housing (10) which has first (P) and second (E) fluid ports each configured to be opened and closed in a controlled manner by movement of a closing unit (30)
   and at least one other fluid port (A) which is provided on the valve housing and which forms a fluid channel (46) toward the first and second fluid ports which can be alternately interrupted by the closing unit, the closing unit being provided on an armature unit (28), which is guided within the valve housing in a manner displaceable along a longitudinal axis of movement (12) and can be driven in response to energization of a coil unit (14, 16) provided stationary in the valve housing, the armature unit being displaceable between opposite first and second closed positions, being configured for magnetic interaction with a stationary core unit (18) which is at least partially surrounded by the coil unit and being pre-loaded into one of the closed positions by force storage means, acting on the armature unit, the first closed position being realized by a valve seat (44) connected to the first fluid port, wherein the core unit has an oblong sleeve portion (22) continuing a core body (20) in an axial manner, having a smaller diameter than the core body, and forming, at its end, a valve seat for the second closed position associated with the second fluid port, a portion of the armature unit axially extending over the sleeve portion (22), and the sleeve portion having a reduced wall thickness in one area in such a manner that an increase in magnetic resistance to a magnetic flux generated by the energized coil unit and flowing toward the armature unit occurs in said area, the force storage means, which surround the wall of the sleeve portion, being connected or interacting with the armature unit at one end and with the core unit at the other end in such a manner that the force storage means are located outside of the fluid channel from the second fluid port to the other fluid port, wherein an axially extending centric bore (24; 25, 27) for conducting fluid is formed in the sleeve portion, wherein the axially extending centric bore (25, 27) is continuous and has a widening in the area (29) of increased magnetic resistance, said widening influencing a wall thickness of the sleeve portion in the area (29).

15. The device according to claim 14, wherein a wall thickness in the area is depressed by at least 60% with respect to an adjacent undepressed wall thickness of the sleeve portion.

16. The device according to claim 15, wherein the wall thickness is depressed by at least 80% with respect to the adjacent undepressed wall thickness.

17. The device according to claim 14, wherein the widening is realized by another bore (27), which has a larger bore diameter and extends through the core body and to the area (29) of increased magnetic resistance.

\* \* \* \* \*